(12) United States Patent
Wu

(10) Patent No.: US 10,652,794 B2
(45) Date of Patent: May 12, 2020

(54) METHOD OF CONFIGURING A USER EQUIPMENT CONFIGURATION AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/297,750

(22) Filed: Mar. 11, 2019

(65) Prior Publication Data

US 2019/0281518 A1 Sep. 12, 2019

Related U.S. Application Data

(60) Provisional application No. 62/641,389, filed on Mar. 11, 2018, provisional application No. 62/641,394, filed on Mar. 11, 2018.

(51) Int. Cl.
*H04W 36/12* (2009.01)

(52) U.S. Cl.
CPC .................................. *H04W 36/12* (2013.01)

(58) Field of Classification Search
None
See application file for complete search history.

(56) References Cited

U.S. PATENT DOCUMENTS

| | | | | |
|---|---|---|---|---|
| 2014/0334371 A1* | 11/2014 | Kim | .................. | H04W 52/0206 370/311 |
| 2019/0053120 A1* | 2/2019 | Park | ..................... | H04W 76/27 |
| 2019/0059027 A1* | 2/2019 | Yang | .................. | H04W 36/0066 |
| 2019/0150037 A1* | 5/2019 | Mildh | ................ | H04W 36/0022 |
| 2019/0253937 A1* | 8/2019 | Hsieh | ..................... | H04W 92/12 |
| 2019/0281650 A1* | 9/2019 | Wu | ......................... | H04W 76/11 |
| 2019/0335366 A1* | 10/2019 | Jin | ........................ | H04W 76/19 |
| 2019/0342800 A1* | 11/2019 | Sirotkin | .............. | H04B 17/318 |
| 2019/0357131 A1* | 11/2019 | Sivavakeesar | ...... | H04W 36/245 |

OTHER PUBLICATIONS

3GPP TS 38.401 v15.0.0, Dec. 2017.
3GPP TS 38.473 v15.0.0, Dec. 2017.
3GPP TS 38.331 v15.0.0, Dec. 2017.
3GPP TS 38.300 v15.0.0, Dec. 2017.

* cited by examiner

*Primary Examiner* — Otis L Thompson, Jr.
(74) *Attorney, Agent, or Firm* — Winston Hsu

(57) ABSTRACT

A centralized unit (CU) for handling a handover for a user equipment (UE), executing instructions of: the CU receiving a Handover Request message from a base station (BS) for requesting a handover from the BS to the CU, wherein the Handover Request message comprises the first UE configuration; the CU sending a UE Context Setup Request message comprising the first UE configuration to a distributed unit (DU); the CU receiving a UE Context Setup Response message for responding to the UE Context Setup Request message from the DU, wherein the UE Context Setup Response message comprises a first full configuration indicator and a second UE configuration; and the CU sending a Handover Request Acknowledge message comprising a Radio Resource Control (RRC) message to the BS in response to the Handover Request message, wherein the RRC message comprises the second UE configuration and a second full configuration indicator.

11 Claims, 7 Drawing Sheets

METHOD OF CONFIGURING A USER EQUIPMENT CONFIGURATION AND RELATED COMMUNICATION DEVICE

CROSS REFERENCE TO RELATED APPLICATIONS

This application claims the benefits of U.S. Provisional Application No. 62/641,389 filed on Mar. 11, 2018 and U.S. Provisional Application No. 62/641,394 filed on Mar. 11, 2018, which are incorporated herein by reference.

BACKGROUND OF THE INVENTION

1. Field of the Invention

The present invention relates to a communication device and a method used in a wireless communication system, and more particularly, to a communication device and a method of handling a user equipment (UE) configuration.

2. Description of the Prior Art

In case of a handover for a user equipment (UE) between different service providers or between different base stations (BS(s)) with different versions, Radio Resource Control (RRC) configurations may be different. A BS taking over the handover does not know configurations for the UE in a previous BS (e.g., source BS). Thus, determining a full configuration for the UE for the handover is an important problem to be solved.

SUMMARY OF THE INVENTION

The present invention therefore provides a device and a method for handling a UE configuration to solve the above-mentioned problem.

A centralized unit (CU) for handling a handover for a user equipment (UE), comprises at least one storage device; and at least one processing circuit, coupled to the at least one storage device. The at least one storage device stores instructions, and the at least one processing circuit is configured to execute the instructions of: the CU receiving a Handover Request message from a base station (BS) for requesting a handover from the BS to the CU for the UE, wherein the Handover Request message comprises the first UE configuration; the CU sending a UE Context Setup Request message comprising the first UE configuration to a distributed unit (DU); the CU receiving a UE Context Setup Response message for responding to the UE Context Setup Request message from the DU, wherein the UE Context Setup Response message comprises a first full configuration indicator and a second UE configuration; and the CU sending a Handover Request Acknowledge message comprising a Radio Resource Control (RRC) message to the BS in response to the Handover Request message, wherein the RRC message comprises the second UE configuration and a second full configuration indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
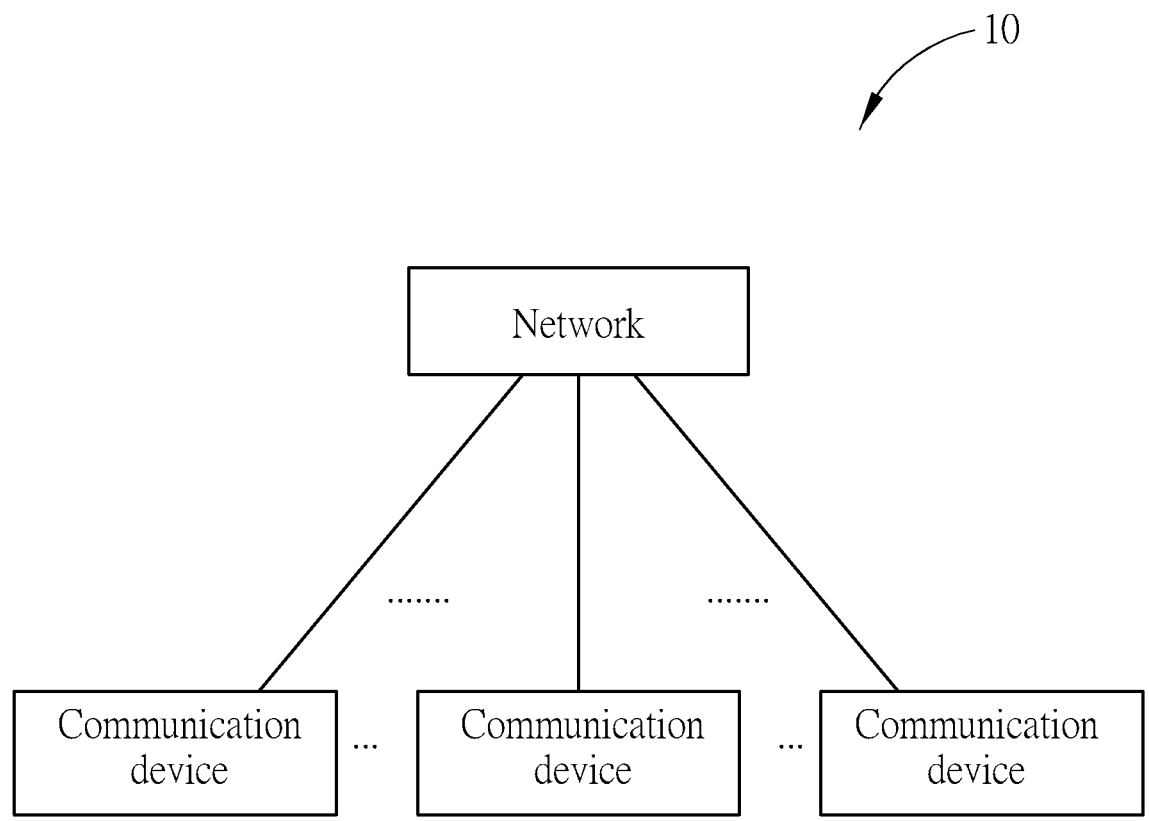
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers in the same or different duplexing modes (e.g., frequency-division duplexing (FDD), time-division duplexing (TDD) or flexible duplexing).

In FIG. 1, the network and the communication devices are simply utilized for illustrating the structure of the wireless communication system 10. The network includes a new Radio (NR) radio access network (RAN). The NR RAN includes at least one 5G base station (BS) (or called gNB) which connects to a fifth generation core (5GC).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (e.g., transmission direction), e.g., for an uplink (UL), the communication device is the transmitter and the network is the receiver, and for a downlink (DL), the network is the transmitter and the communication device is the receiver.

Figure 2:
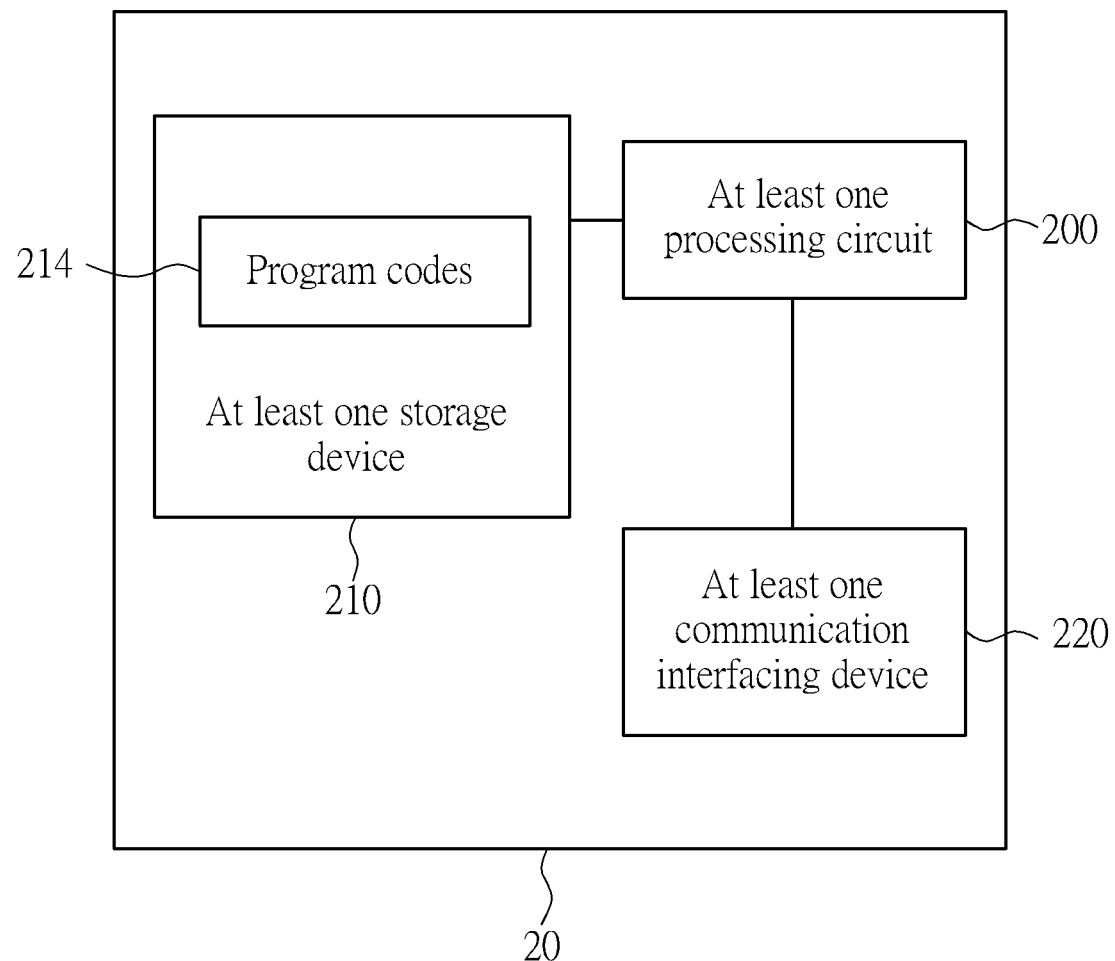
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 of which may be a microprocessor or an Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver transmitting and receiving signals (e.g., data, messages and/or packets) according to processing results of the at least one processing circuit 200.

Figure 3:
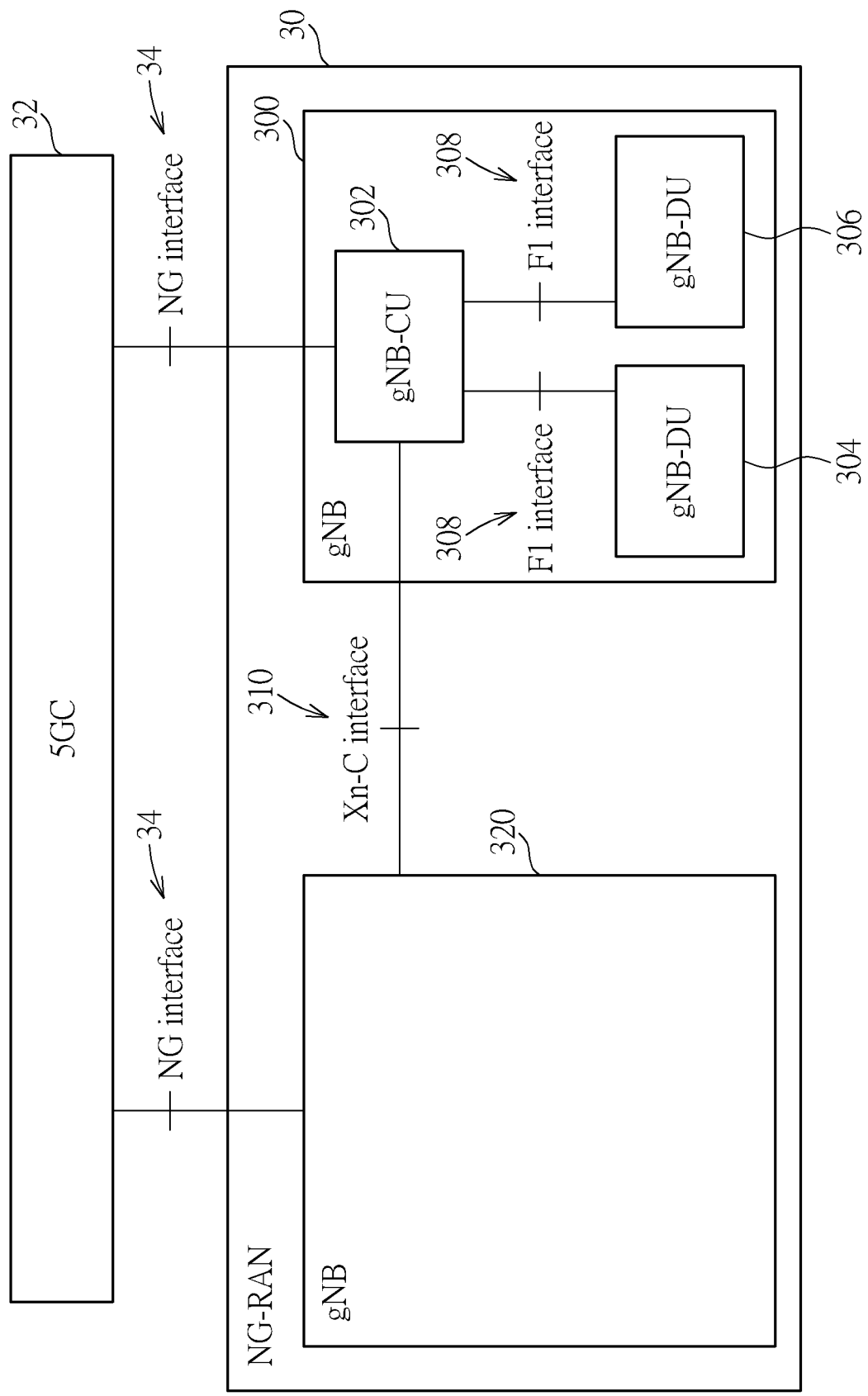
FIG. 3 is a schematic diagram of a NG-RAN according to an example of the present invention.

FIG. 3 is an example of a next generation-RAN (NG-RAN) 30 consisting of at least one gNB connected to a 5GC 32 through a NG interface 34 according to an example of the present invention. A gNB can support a FDD mode operation, a TDD mode operation or a dual mode operation. gNBs can be interconnected via a Xn interface. A gNB may include a gNB-Centralized Unit (gNB-CU) and at least one gNB-Distributed Unit (gNB-DU(s)). One gNB-DU is connected to only one gNB-CU. For the NG-RAN 30, the NG interface 34 and a Xn-C interface 310 for a gNB 300 consisting of a gNB-CU 302 and at least one gNB-DU, terminate in the gNB-CU 302. The gNB-CU 302 connects to gNB-DUs 304 and 306 via F1 interfaces 308. The gNB 300 and a gNB 320 are interconnected via the Xn-C interface 310. The gNB-CU and the connected gNB-DUs are only visible to other gNBs and the 5GC 32 as the gNB 300.

In the following examples, a UE is used for representing the communication device in FIG. 1, to simplify the illustration of the examples. A CU may be a gNB-CU in FIG. 3 and a DU may be a gNB-DU in FIG. 3. In addition, A BS is used to represent the gNB in FIG. 3. It should be noted that the scope of the invention is not limited thereto.

Figure 4:
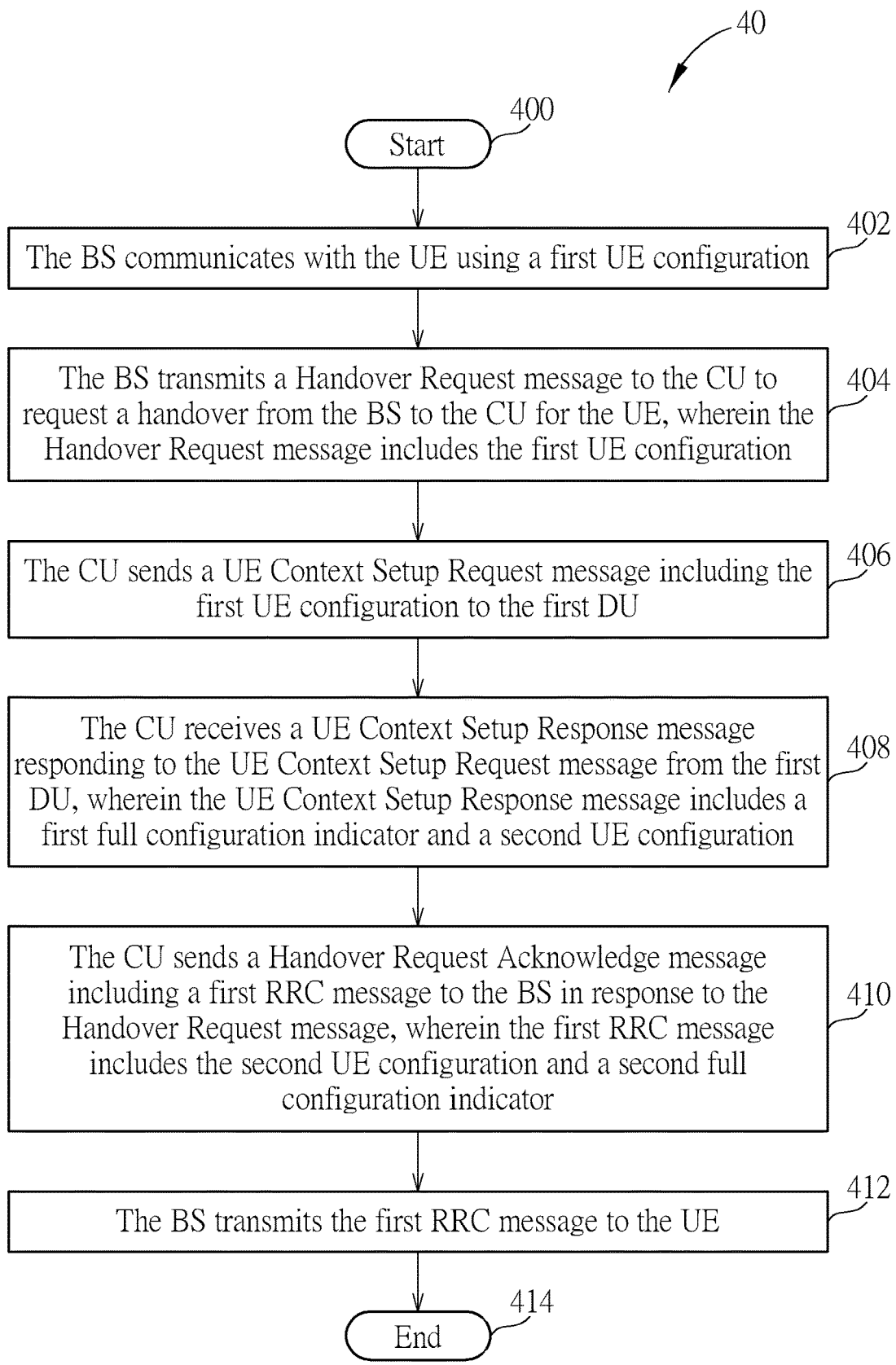
FIG. 4 is a flowchart of a process according to an example of the present invention.

A process 40 in FIG. 4 is utilized in a network including a BS, a CU and a first DU for handling a handover for a UE, and includes the following steps:

Step 400: Start.

Step 402: The BS communicates with the UE using a first UE configuration.

Step 404: The BS transmits a Handover Request message to the CU to request a handover from the BS to the CU for the UE, wherein the Handover Request message includes the first UE configuration.

Step 406: The CU sends a UE Context Setup Request message including the first UE configuration to the first DU.

Step 408: The CU receives a UE Context Setup Response message responding to the UE Context Setup Request message from the first DU, wherein the UE Context Setup Response message includes a first full configuration indicator and a second UE configuration.

Step 410: The CU sends a Handover Request Acknowledge message including a first Radio Resource Control (RRC) message to the BS in response to the Handover Request message, wherein the first RRC message includes the second UE configuration and a second full configuration indicator.

Step 412: The BS transmits the first RRC message to the UE.

Step 414: End.

According to the process 40, the CU receives the Handover Request message from the BS and sends the UE Context Setup Request message in response to (or according to) the Handover Request message.

In one example, the CU determines to include the second full configuration indicator in the first RRC message in response to (or according to) the first full configuration indicator. If the UE Context Setup Response message does not include the first full configuration indicator, the first RRC message may not include the second full configuration indicator. That is, the first DU informs the CU that a full configuration option is used for the second UE configuration by the first full configuration indicator. Then, the CU informs the UE that the full configuration option is used for the second UE configuration by the second full configuration indicator in the first RRC message.

The following examples may be applied to the process 40.

In one example, the UE receives a second RRC message including the first UE configuration from the BS on a signalling radio bearer (SRB). The UE transmits a second RRC response message to the BS on the SRB to the BS, in response to the second RRC message.

In one example, the first DU includes the first full configuration indicator in the UE Context Setup Response message, because the first DU does not comprehend a configuration in the first UE configuration and is not able to use delta configuration. In another example, the first DU includes the first full configuration indicator, because the first DU does not support the delta configuration, i.e., the first DU does not fully comprehend (or parse) the first UE configuration. To support the delta configuration, the first DU needs to fully comprehend (or parse) the first UE configuration.

In one example, the UE connects to (or communicates with) the first DU according to the second UE configuration instead of the first UE configuration. The first DU communicates with the UE according to the second UE configuration instead of the first UE configuration. The UE transmits a first RRC response message to the first DU when connecting to the first DU. The first DU forwards the first RRC response message to the CU. The CU may transmit a Context Release message to the BS. The BS releases the first UE configuration in response to the Context Release message.

In one example, the first UE configuration includes a first plurality of configurations. The second UE configuration includes a second plurality of configurations. For example, the first UE configuration may be a first Cell Group Configuration (e.g., a first CellGroupConfig), and the second UE configuration may be a second Cell Group Configuration (e.g., a second CellGroupConfig). For example, the first UE configuration (or the first CellGroupConfig) includes at least one of a physical layer configuration, a medium access control (MAC) configuration, a radio link control (RLC) configuration, e.g., of which each includes a plurality of configurations. For example, the second UE configuration (or the second CellGroupConfig) includes at least one of a random access configuration, a physical layer configuration, a MAC configuration, a RLC configuration and a secondary cell configuration, e.g., of which each includes a plurality of configurations.

In one example, the BS communicates (e.g., transmit or receive) protocol data unit(s) (PDU(s)) with (e.g., to or from) the UE using the first UE configuration. The PDU(s) can be MAC PDU(s) or RLC PDU(s). The BS may be a gNB. The BS may be a single unit (or a single device) or may consist of a CU and a DU. In case of the BS consisting of the CU and the DU, the CU of the BS transmits the first RRC message to the UE via the DU of the BS. The CU of the BS transmits the second RRC message to the UE via the DU of the BS, and receives the second RRC response message from the UE via the DU of the BS. The CU of the BS transmits the Handover Request message to the CU, and receives the Handover Request Acknowledge message from the CU.

In one example, the first DU communicates (e.g., transmit or receive) PDU(s) with (e.g., to or from) the UE using the second UE configuration. The PDU(s) can be the MAC PDU(s) or the RLC PDU(s).

In one example, the BS sends the Handover Request message to the CU in response to (or according to, triggered by) a measurement result. In one example, the measurement result is obtained by the BS from signal(s) transmitted by the UE. In another example, the measurement result is received by the BS from the UE in a measurement report message transmitted by the UE.

In one example, when the UE receives the second full configuration indicator and the second UE configuration, the UE releases the first UE configuration and the UE applies the second UE configuration to communicate with the first DU, in response to the second full configuration indicator.

In one example, the first full configuration indicator may be included in the second UE configuration. In this case, the second full configuration indicator above becomes the first full configuration indicator. The CU does not generate the second full configuration indicator, and does not include the second full configuration indicator in the first RRC message. In this case, steps 408 and 410 in the process 40 may be modified as to steps 408a and 410a as follows.

Step 408a: The CU receives a UE Context Setup Response message responding to the UE Context Setup Request message from the first DU, wherein the UE Context Setup Response message includes a second UE configuration and the second UE configuration includes the first full configuration indicator.

Step 410a: The CU sends a Handover Request Acknowledge message including a first RRC message to the first BS in response to the Handover Request message, wherein the first RRC message includes the second UE configuration.

In the case of steps 408a and 410a, the UE may perform operations according to the first full configuration indicator as the operations described above for the second full configuration indicator.

Figure 5:
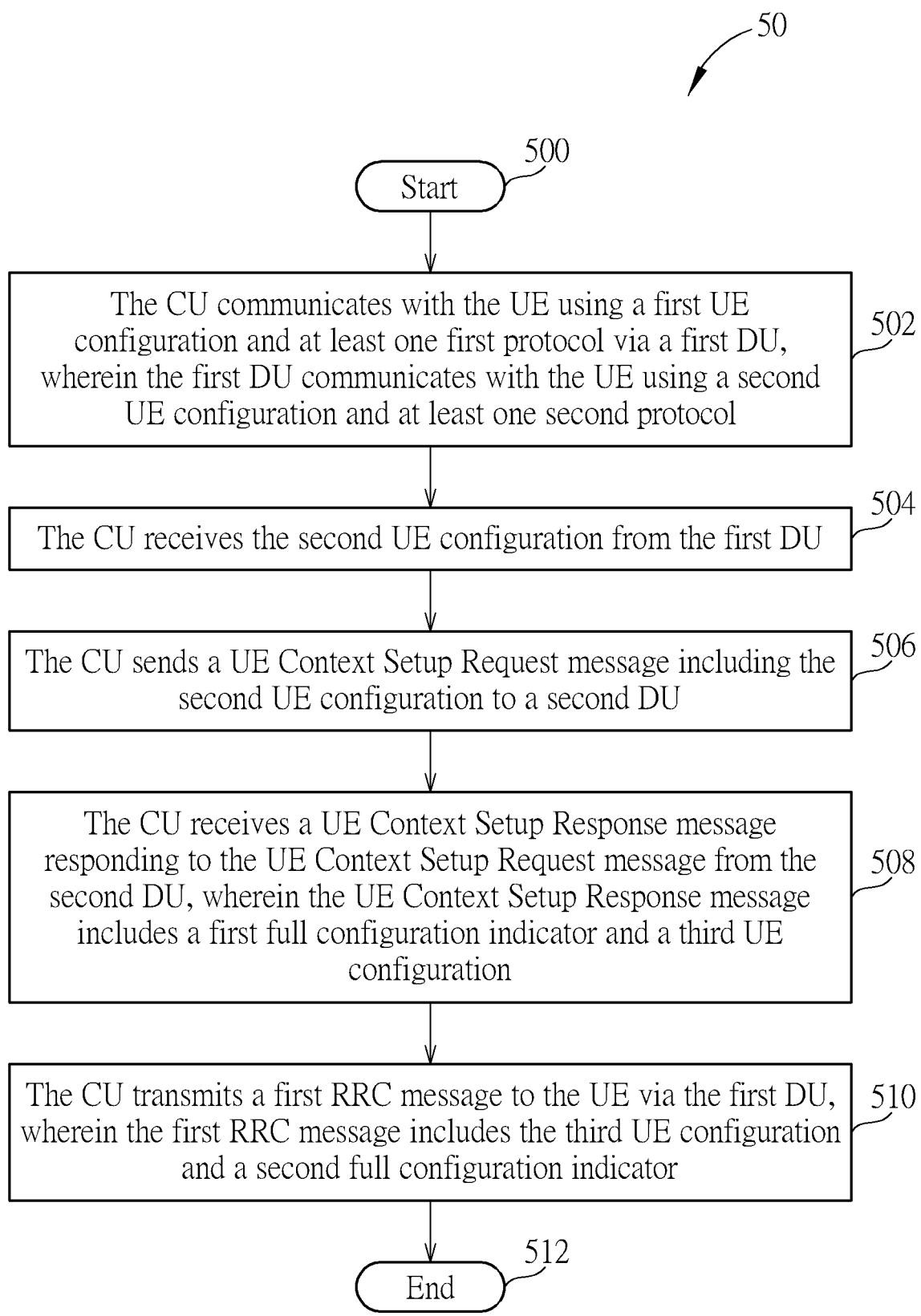
FIG. 5 is a flowchart of a process according to an example of the present invention.

A process 50 in FIG. 5 is utilized in a network comprising a CU and a plurality of DUs for changing a DU for a UE, and includes the following steps:

Step 500: Start.

Step 502: The CU communicates with the UE using a first UE configuration and at least one first protocol via a first DU, wherein the first DU communicates with the UE using a second UE configuration and at least one second protocol.

Step 504: The CU receives the second UE configuration from the first DU.

Step 506: The CU sends a UE Context Setup Request message including the second UE configuration to a second DU.

Step 508: The CU receives a UE Context Setup Response message responding to the UE Context Setup Request message from the second DU, wherein the UE Context Setup Response message includes a first full configuration indicator and a third UE configuration.

Step 510: The CU transmits a first RRC message to the UE via the first DU, wherein the first RRC message includes the third UE configuration and a second full configuration indicator.

Step 512: End.

In one example, the CU determines to include the second full configuration indicator in the first RRC message according to (or in response to) the first full configuration indicator. If the UE Context Setup Response message does not include the first full configuration indicator, the CU does not include the second full configuration indicator in the first RRC message. That is, the second DU informs the CU that a full configuration option is used for the third UE configuration by the first full configuration indicator. Then, the CU informs the UE that the full configuration option is used for the third UE configuration by the second full configuration indicator in the first RRC message.

The following examples may be applied to the process 50.

In one example, the UE receives the first UE configuration and the second UE configuration from a third DU. The third DU may be the first DU, or a DU different from the first DU. For example, the UE receives a second RRC message including the first UE configuration from the CU on a SRB via the third DU. The UE may transmit a second RRC response message to the BS on the SRB to the CU via the third DU, in response to the second RRC message. For example, the UE receives a third RRC message including the second UE configuration from the CU on the SRB via the third DU. The UE transmits a third RRC response message to the CU on the SRB via the third DU, in response to the third RRC message. The second RRC message and the third RRC message may be the same message (e.g., instance) or different messages. The second RRC response message and the third RRC response message may be the same message (e.g., instance) or different messages.

In one example, the second DU includes the first full configuration indicator in the UE Context Setup Response message, because the second DU does not comprehend a configuration in the second UE configuration and is not able to use delta configuration. In one example, the second DU includes the first full configuration indicator in the UE Context Setup Response message, because the second DU does not support the delta configuration, i.e., does not comprehend (or parse) the first UE configuration.

In one example, the UE connects to (or communicates with) the second DU according to the third UE configuration instead of the second UE configuration. The second DU communicates with the UE according to the third UE configuration instead of the second UE configuration. The UE transmits a first RRC response message to the second DU in response to the first RRC message. The second DU forwards the first RRC response message to the CU.

In one example, the first UE configuration includes at least one configuration. In one example, the first UE configuration includes at least one of a packet data convergence protocol (PDCP) configuration, a data radio bearer (DRB) configuration, a SRB configuration and a Service Data Convergence Protocol (SDAP) configuration. The DRB configuration includes a DRB identity. The SRB configuration includes a SRB identity. In one example, the first UE configuration includes at least one of a DRB configuration and a SRB configuration. The DRB configuration includes a DRB identity, a PDCP configuration and a SDAP configuration. The SRB configuration includes a SRB identity and a PDCP configuration.

In one example, the second UE configuration includes a first plurality of configurations. The third UE configuration includes a second plurality of configurations. For example, the second UE configuration may be a first Cell Group Configuration (e.g., a first CellGroupConfig), and the third UE configuration may be a second Cell Group Configuration (e.g., a second CellGroupConfig). For example, the second UE configuration (or the first CellGroupConfig) includes at least one of a physical layer configuration, a MAC configuration and a RLC configuration, e.g., of which each includes a plurality of configurations. For example, the third UE configuration (or the second CellGroupConfig) includes at least one of a random access configuration, a physical layer configuration, a MAC configuration, a RLC configuration and a secondary cell configuration, e.g., of which each includes a plurality of configurations.

In one example, the CU transmits a UE Context Modification Request message to the first DU in response to the DU change. The CU receives a UE Context Modification Response message responding to the UE Context Modification Request message from the first DU.

In one example, the CU transmits a UE Context Release Command message to the first DU, if the CU detects the UE, e.g., receive data from the UE via the second DU. In one example, the CU transmits the UE Context Release Command message to the first DU in response to the first RRC response message. In one example, the CU transmits the UE Context Release Command message to the first DU, if the second DU detects access from the UE, e.g., in a random access procedure and indicates the detection to the CU.

In one example, the CU may receive a UE Context Release Complete message responding to the UE Context Release Command message, from the first DU.

In one example, the CU connects to the first DU and the second DU. The CU connects to the third DU. In one example, the CU generates the first RRC message. In one example, the CU generates the second RRC message.

In one example, when the UE receives the second full configuration indicator, the UE releases the second UE configuration and the UE applies the third UE configuration to communicate with the second DU, in response to the second full configuration indicator.

In one example, one of the at least one first protocol may comprise a PDCP. The CU may communicate (e.g., transmit or receive) PDCP PDU(s) with (e.g., to or from) the UE using one of the first UE configuration (e.g., a PDCP configuration or a DRB configuration). In one example, one of the at least one first protocol may comprise a RRC protocol. The CU may communicate RRC message(s) or PDU(s) with the UE using one of the first UE configuration (e.g., a SRB configuration).

In one example, the first DU communicates (e.g., transmits or receives) PDU(s) with (e.g., to or from) the UE using the second UE configuration (e.g., including a MAC configuration or a RLC configuration). The PDU(s) may be MAC PDU(s) or RLC PDU(s). The second DU communicates (e.g., transmits or receives) PDU(s) with (e.g., to or from) the UE using the third UE configuration (e.g., including a MAC configuration or a RLC configuration). The PDU(s) may be the MAC PDU(s) or the RLC PDU(s).

In one example, the first full configuration indicator may be included in the third UE configuration. In this case, the second full configuration indicator above becomes the first full configuration indicator. The CU does not generate the second full configuration indicator, and does not include the second full configuration indicator in the first RRC message. In this case, steps 508 and 510 may be modified to steps 508a and 510a as follows.

Step 508a: The CU receives a UE Context Setup Response message responding to the UE Context Setup Request message from the second DU, wherein the UE Context Setup Response message includes a third UE configuration and the third UE configuration includes a first full configuration indicator.

Step 510a: The CU transmits a first RRC message to the UE via the first DU, wherein the first RRC message includes the third UE configuration.

The UE performs operations according to the first full configuration indicator as the operations described above for the second full configuration indicator.

The following examples may be applied to the above processes.

Figure 6:
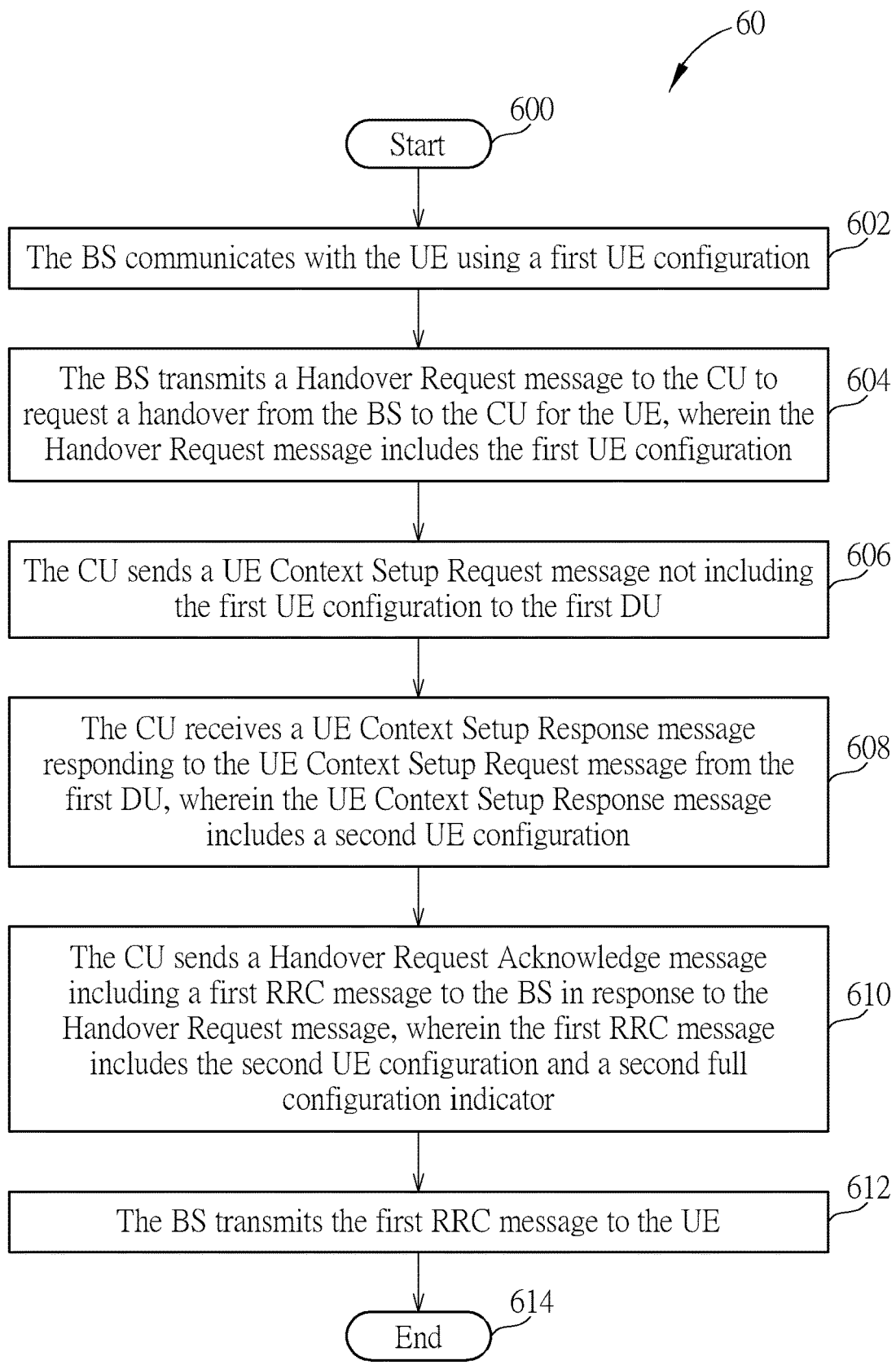
FIG. 6 is a flowchart of a process according to an example of the present invention.

A process 60 in FIG. 6 is utilized in a network including a BS, a CU and a first DU for handling a handover for a UE, and includes the following steps:

Step 600: Start.
Steps 602-604: Same as the steps 402-404.
Step 606: The CU sends a UE Context Setup Request message not including the first UE configuration to the first DU.
Step 608: The CU receives a UE Context Setup Response message responding to the UE Context Setup Request message from the first DU, wherein the UE Context Setup Response message includes a second UE configuration.
Steps 610-612: Same as the steps 410-412.
Step 614: End.

Examples for the process 40 may be applied to the process 60.

In one example, the CU does not (or determines not to) include the first UE configuration in the UE Context Setup Request message, because the first DU may not support delta configuration. That is, the first DU may not comprehend (or parse) the first UE configuration. In another example, the CU does not (or determines not to) include the first UE configuration in the UE Context Setup Request message, because the CU may not want to do so.

In one example, the first DU includes a first full configuration indicator in the UE Context Setup Response message. That is, the first DU informs the CU that a full configuration option is used for the second UE configuration by the first full configuration indicator. Then, the CU determines to include the second full configuration indicator in response to (or according to) the first full configuration indicator and may inform the UE that the full configuration option is used for the second UE configuration by the second full configuration indicator in the first RRC message.

In one example, the first DU does not include the first full configuration indicator in the UE Context Setup Response message, and the first DU does not include a delta configuration indicator in the UE Context Setup Response message either. Then, the CU determines to include the second full configuration indicator in the first RRC message, since the CU does not send the first UE configuration to the first DU, or the UE Context Setup Response message neither includes the first full configuration indicator nor includes the delta configuration indicator. Thus, the second UE configuration includes full configurations (or complete configurations) for the UE, i.e., the second UE configuration is not delta (i.e., including difference) from the first UE configuration.

In one example, step 604 may be replaced by 604a: the BS determines not to include the first UE configuration in the Handover Request message.

In one example, the second full configuration indicator is used to inform the UE of releasing the first UE configuration and applying the second UE configuration (i.e., replacing the first UE configuration with the second UE configuration).

In one example, the second full configuration indicator may be included in the second UE configuration by the first DU. In this case, the CU does not generate the second full configuration indicator and does not include the second full configuration indicator in the first RRC message. In this case, steps 608 and 610 in the process 60 may be replaced by the steps 408a and 410a.

Figure 7:
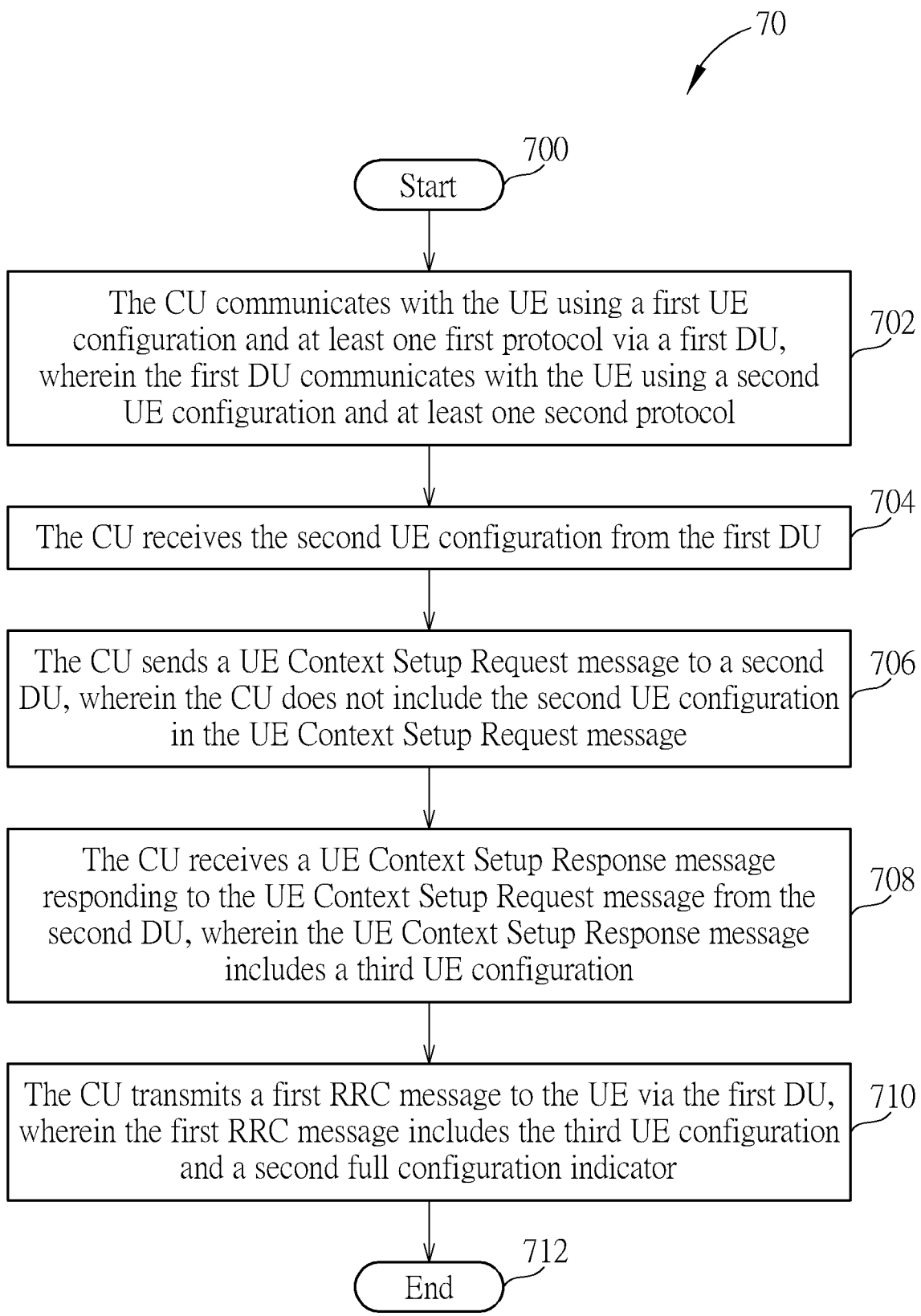
FIG. 7 is a flowchart of a process according to an example of the present invention.

A process 70 in FIG. 7 is utilized in a network comprising a CU and a plurality of DUs for changing a DU for a UE, and includes the following steps:

Step 700: Start.
Steps 702-704: Same as the steps 502-504.
Step 706: The CU sends a UE Context Setup Request message to a second DU, wherein the CU does not include the second UE configuration in the UE Context Setup Request message.
Step 708: The CU receives a UE Context Setup Response message responding to the UE Context Setup Request message from the second DU, wherein the UE Context Setup Response message includes a third UE configuration.
Step 710: Same as the step 510.
Step 712: End.

In one example, the CU does not (or determines not to) include the second UE configuration in the UE Context Setup Request message, because the second DU does not support delta configuration. That is, the second DU does not comprehend (or parse) the second UE configuration. In another example, the CU does not (or determines not to) include the second UE configuration in the UE Context Setup Request message, because the CU does not support delta configuration for some configuration(s) configured by the BS. In one example, the CU does not (or determines not to) include the second UE configuration in the UE Context Setup Request message, because the CU may not want to do so.

In one example, the second DU does not include a first full configuration indicator in the UE Context Setup Response message, and the second DU does not include a delta configuration indicator in the UE Context Setup Response message either. Then the CU determines to include the second full configuration indicator in the first RRC message since the CU does not send the second UE configuration to the second DU, or the UE Context Setup Response message neither includes the first full configuration indicator nor includes the delta configuration indicator. Thus, the third UE configuration includes full configurations (or complete configurations) for the UE, i.e., the third UE configuration is not delta (i.e., including difference) from the second UE configuration.

In one example, the second DU includes the first full configuration indicator in the UE Context Setup Response message. That is, the second DU informs the CU that a full configuration option is used for the third UE configuration by the first full configuration indicator. Then the CU determines to include the second full configuration indicator in response to (or according to) the first full configuration indicator and informs the UE that the full configuration option is used for the third UE configuration by the second full configuration indicator in the first RRC message.

In one example, the second full configuration indicator is used to inform the UE of releasing the second UE configuration and applying the third UE configuration (i.e., replacing the second UE configuration with the third UE configuration). The UE releases the second UE configuration and applies the third UE configuration in response to the second full configuration indicator.

The following examples may be applied to the process 70.

In one example, the CU transmits a UE Context Modification Request message to the first DU in response to the DU change. The CU receives a UE Context Modification Response message responding to the UE Context Modification Request message from the first DU.

Description for the process 50 may be applied to the process 70, and is not repeated herein.

The following examples may be applied to the processes above.

In one example, the Handover Request message includes at least one of UE Radio Capabilities, a PDCP configuration, a DRB configuration, a SRB configuration and a SDAP configuration. The DRB configuration includes a DRB identity. The SRB configuration includes a SRB identity. For example, the Handover Request message includes a radio bearer configuration (e.g., RadioBearerConfig).

In one example, the RRC message above may be a RRC Connection Reconfiguration message, and the RRC response message above may be a RRC Connection Reconfiguration Complete message. In another example, the RRC message above may be a RRC Reconfiguration message, and the RRC response message above may be a RRC Reconfiguration Complete message.

In one example, the UE Context Setup Request message includes at least one of protocol identit(ies) (or protocol identifier(s)), UE Radio Capabilities of the UE, a SRB identity, a DRB identity and a cell identity. In addition, the UE Context Setup Response message includes at least one of protocol identit(ies) (or protocol identifier(s)), a SRB identity and a DRB identity.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention.

Those skilled in the art should readily make combinations, modifications and/or alterations on the abovementioned steps, description and examples. Some steps described above may not necessarily have to be used in the invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. Any of the processes above may be compiled into the program codes 214. For the process involving a BS, a CU or a DU, steps performed by the BS, the CU or the DU may be compiled into the program codes 214 of the BS, the CU or the DU.

To sum up, the present invention provides a method and related communication device for handling a UE configuration for a UE for a handover. Thus, the problem for determining a full configuration for the UE for the handover can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A centralized unit (CU) for handling a handover for a communication device, comprising:
at least one storage device; and
at least one processing circuit, coupled to the at least one storage device, wherein the at least one storage device stores instructions, and the at least one processing circuit is configured to execute the instructions of:
the CU receiving a Handover Request message from a base station (BS) for requesting a handover from the BS to the CU for the communication device, wherein the Handover Request message comprises a first communication device configuration;
the CU sending a communication device Context Setup Request message comprising the first communication device configuration to a distributed unit (DU);
the CU receiving a communication device Context Setup Response message for responding to the communication device Context Setup Request message from the DU, wherein the communication device Context Setup Response message comprises a first full configuration indicator and a second communication device configuration; and
the CU sending a Handover Request Acknowledge message comprising a Radio Resource Control (RRC) message to the BS in response to the Handover Request message, wherein the RRC message comprises the second communication device configuration and a second full configuration indicator.

2. The CU of claim 1, wherein the CU receives the Handover Request message from the BS, and sends the communication device Context Setup Request message in response to the Handover Request message.

3. The CU of claim 1, wherein the CU comprises the second full configuration indicator in the RRC message according to the first full configuration indicator.

4. A network comprising a centralized unit (CU) and a plurality of distributed units (DU(s)) for changing a DU for a communication device, comprising:
   at least one storage device; and
   at least one processing circuit, coupled to the at least one storage device, wherein the at least one storage device stores instructions, and the at least one processing circuit is configured to execute the instructions of:
   the CU communicating with the communication device using a first communication device configuration and at least one first protocol via a first DU, wherein the first DU communicates with the communication device using a second communication device configuration and at least one second protocol;
   the CU receiving the second communication device configuration from the first DU;
   the CU sending a communication device Context Setup Request message comprising the second communication device configuration to a second DU;
   the CU receiving a communication device Context Setup Response message responding to the communication device Context Setup Request message from the second DU, wherein the communication device Context Setup Response message comprises a first full configuration indicator and a third communication device configuration; and
   the CU transmitting a Radio Resource Control (RRC) message to the communication device via the first DU, wherein the RRC message comprises the third communication device configuration and a second full configuration indicator.

5. The network of claim 4, wherein the CU comprises the second full configuration indicator in the RRC message according to the first full configuration indicator.

6. The network of claim 4, wherein the CU transmits a communication device Context Modification Request message to the first DU in response to the DU change.

7. The network of claim 4, wherein the CU transmits a communication device Context Release Command message to the first DU if the CU detects the communication device.

8. A centralized unit (CU) for handling a handover for a communication device, comprising:
   at least one storage device; and
   at least one processing circuit, coupled to the at least one storage device, wherein the at least one storage device stores instructions, and the at least one processing circuit is configured to execute the instructions of:
   the CU receiving a Handover Request message from a base station (BS) for requesting a handover from the BS to the CU, wherein the Handover Request message comprises a first communication device configuration for the communication device;
   the CU sending a communication device Context Setup Request message not comprising the first communication device configuration to a distributed unit (DU);
   the CU receiving a communication device Context Setup Response message responding to the communication device Context Setup Request message from the DU, wherein the communication device Context Setup Response message comprises a second communication device configuration; and
   the CU sending a Handover Request Acknowledge message comprising a Radio Resource Control (RRC) message to the BS in response to the Handover Request message, wherein the RRC message comprises the second communication device configuration and a first full configuration indicator.

9. The CU of claim 8, wherein the communication device Context Setup Response message comprises a second full configuration indicator.

10. The CU of claim 8, wherein the communication device Context Setup Response message does not include a second full configuration indicator.

11. The CU of claim 8, wherein the first full configuration indicator is used to inform the communication device of releasing the first communication device configuration and applying the second communication device configuration.

* * * * *